United States Patent [19]

Pölling

[11] Patent Number: 4,744,454

[45] Date of Patent: May 17, 1988

[54] TIPPING CONVEYOR ELEMENT FOR A PACKAGE CONVEYOR

[75] Inventor: Ludger Pölling, Wadersloh, Fed. Rep. of Germany

[73] Assignee: Bernhard Beumer Maschinenfabrik KG, Beckum, Fed. Rep. of Germany

[21] Appl. No.: 8,351

[22] Filed: Jan. 29, 1987

[30] Foreign Application Priority Data

Jan. 31, 1986 [DE] Fed. Rep. of Germany ....... 3602861

[51] Int. Cl.[4] ............................................. B65G 47/46
[52] U.S. Cl. .................................... 198/365; 198/802; 198/477.1
[58] Field of Search ...................... 198/365, 477.1, 802

[56] References Cited

U.S. PATENT DOCUMENTS

| | | | |
|---|---|---|---|
| 4,004,681 | 1/1977 | Clewett et al. | 198/365 |
| 4,139,088 | 2/1979 | Olesen | 198/365 |
| 4,278,165 | 7/1981 | Nielsen et al. | 198/365 |
| 4,413,721 | 11/1983 | Bollier | 198/802 |
| 4,635,785 | 1/1987 | Prydtz | 198/365 |

FOREIGN PATENT DOCUMENTS 3050102 4/1982 Fed. Rep. of Germany .

Primary Examiner—Joseph E. Valenza

Attorney, Agent, or Firm—Oblon, Fisher, Spivak, McClelland & Maier

[57] ABSTRACT

A tipping conveyor element for a package conveyor, whose driven conveyor line includes a plurality of conveyor elements flexibly connected to one another. When the conveyor is in an untipped conveying condition, a package is placed on an essentially horizontal carrying surface. By tipping of the carrying surface, the package is delivered, as desired, to one of several delivery stations provided laterally to the conveyor direction along the conveyor track. The conveyor element includes a carrying element having a carrying surface, the carrying element being supported by a support device above a support part which is movable along a guide. The carrying element is mounted to be rotatable around a first swivel axis by means of a first shaft extending obliquely downward from the underside of the carrying element. The first swivel axis lies in a common vertical plane with a plane of symmetry of the carrying element when the carrying element is disposed in the conveying condition. It forms an acute angle with the carrying surface, whereby the first swivel axis, in tipping of the carrying element, is made to rotate in a controlled manner around a second swivel axis that is disposed at an angle with respect to the first swivel axis.

17 Claims, 3 Drawing Sheets

TIPPING CONVEYOR ELEMENT FOR A PACKAGE CONVEYOR

BACKGROUND OF THE INVENTION

1. Field of the Invention

The invention relates to a tipping conveyor element for a package conveyor, in practice also indentified in brief as a sorter.

2. Discussion of the Background

A driven conveyor line of the above-noted type comprises a plurality of conveyor elements flexibly connected to one another. At least one package is placed on an essentially horizontal carrying surface while a tippable element is in a conveying condition. By tipping of the carrying surface, producing a tilt, the package is delivered, as desired, to one of several delivery stations provided laterally to the conveyor direction along the conveyor track. A carrying element contains the carrying surface. The carrying element is supported by a support device mounted on a support part movable along a guide. The carrying element is mounted to be rotatable around a swivel axis by means of a shaft extending obliquely downward from its underside relative to the support part. The swivel axis lies in a common vertical plane (also identified below as the "initial plane") with a plane of symmetry of the carrying element or its carrying surface when the carrying element is in the conveying condition. It is angled in the conveyor direction and forms an acute angle with the carrying surface.

The packages are so fed to a sorter at one feed point at least (but often also at several feed points) that in each case they are placed, when the conveyor element is in the conveying condition, on the essentially horizontal carrying surface of a conveyor element. When above or hereafter it is said that the carrying surface of the conveyor element in the conveying condition is "essentially" horizontal, this is to include the following variations. The carrying surface optionally can also be curved or bent in the shape of a dish. The conveyor line can run in a horizontal plane, but also obliquely to the horizontal or in other directions, in which case care is to be taken that the packages do not involuntarily slide down from the carrying surfaces.

The essential object of a sorter consists in delivering in each case the packages to one of the several delivery stations placed laterally to the conveyor track to sort them according to specific criteria. In the case of mail parcels this can be, for example, a sorting according to zip codes or in the case of a sorter used at an airport, a sorting of checked in pieces of luggage according to flight destination or the like. In this connection, the packages are generally provided with a code before their delivery to the sorter or they exhibit a marking from the beginning, which is readable by a reading device after their check-in, whereby the code or marking is assigned to a specific delivery station, and by certain devices care is taken that a package assigned to a specific delivery station is delivered to it laterally from the sorter. At the respective delivery point the package is sent, generally by a chute, to a conveyor having a conveyor direction running crosswise to the sorter, from which it is reconveyed for further processing.

To accomplish the desired delivery of a package to a specific delivery station, obviously it would be basically possible to shove the package laterally from the carrying surface (in this case, the carrying surface remaining essentially horizontal) of the respective conveyor element, using in each case a stamp or the like running essentially crosswise to the conveyor direction of the sorter. However, such a mode of operation is unsatisfactory, especially in the case of the high conveyor speeds of sorters achieved today, which are up to 2 m/sec and more, if only because the package, with such a delivery, is placed under exceptionally heavy stress. However, as gentle as possible handling of the package in practice is highly desired for all cases of using sorters.

Therefore, conveyor elements have been developed for such package conveyors, in which the carrying surface, at a delivery station, is rotated around a swivel axis placed centrally of the carrying surface and running in the conveyor direction. The central arrangement of the swivel axis to the carrying surface was therefore especially chosen to accommodate, for example, the case of such a sorter in which the delivery points are placed on the left and right of the conveyor track, so that consequently the package must also optionally be delivered either to the left or right. However, this previously known design of a conveyor element for a sorter or the like has proved disadvantageous, because a package located centrally on the carrying surface of the conveyor element is lifted during lateral tipping to the other side of the carrying surface, so that during delivery of the package a tumbling of the package occurs. Here, too, a hardly gentle handling occurs. This is particularly also the case if a package is laterally offset on the carrying surface toward a side thereof that is opposite to the delivery side, in other words, essentially toward that side of the carrying surface which is lifted during tipping. In addition, in the case of a lateral tipping of the carrying surface in a way described above, an oblong package which, i.a., is laid on a conveyor element in its longitudinal direction is so delivered from the sorter that its long side is forward, so that the receiving or transfer devices must be designed correspondingly wide or be provided with corresponding deflection devices, which again does not result in gentle package handling and moreover results in a correspondingly greater expense.

At least to reduce the danger of a tumbling or spinning of a delivered package, conveyor elements have already become known, in which the swivel axis running in the conveyor direction for tipping of the carrying surface is laterally offset with respect to the longitudinal axis of symmetry of the carrying surface. However, such an offset, i.a.—especially with comparitively large carrying surfaces—is not to be achieved in such a way that the swivel axis essentially is disposed in the area of a lateral longitudinal edge of the carrying element. In such a case, the carrying surface, horizontal in the conveying condition, in the case of a lateral tipping is essentially dropped only downward. Therefore, only a relatively small offset of the swivel axis with respect to the longitudinal axis of symmetry is feasible, as a result of which the danger of a tumbling (spin) of the respective package cannot be sufficiently reduced. But since the carrying surface of a conveyor element under discussion here, generally because of the reasons already mentioned above, must be able to be tipped optionally to the left or right, such a configuration for changing over from one swivel axis to the other swivel axis in addition requires a considerable expenditure, which is not only linked to the corresponding costs but also is correspondingly prone to breakdown because of the relatively complicated mechanism. Moreover, with this previously known conveyor element, oblong packages are so delivered by the sorter that their long side is in front, so that, by and large, the disadvantages already mentioned above are present and, moreover, no gently package handling is attained.

For more suitable delivery from the carrying surface of the respective conveyor element of an oblong package placed on a conveyor element, and at the same time for more gentle handling of the package, it would obviously be more suitable during the delivery to impart to the package a turning movement in addition to the tipping movement. However, it is to be kept in mind that the delivery must take place to the smallest space and, in view of the high conveyor speeds of such sorters, in the shortest time, so that, for example, there would occur a first resulting rotation of the carrying element exhibiting the carrying surface around a vertical axis, and only then would begin the tipping of the carrying surface. Such cannot be achieved under pracitcal conditions.

However, an overlapping of a lateral tipping movement with a rotation movement of the carrying surface is possible if the carrying element, during delivery of a package, is rotated not around a vertical swivel axis but around a swivel axis set at an angle to the vertical, whereby the carrying element is mounted to be rotatable around a swivel axis by means of a shaft extending obliquely downward from the underside of the carrying element and relative to a support part carried by the conveyor guide and prevented from rotation by the guide. The swivel axis lies in a common vertical plane with the axis of symmetry of the carrying element or its carrying surface when the carrying element is in the conveying condition. It slopes in the conveyor direction and forms an acute angle with the carrying surface. With such a design of a conveyor element, if the shaft, solidly connected to the carrying element, is rotated around a swivel axis at a delivery point, this obviously results in a rotation of the carrying surface, horizontal in the conveying condition, around the swivel axis and thus at the same time results in a tilt of the carrying surface, so that the package supported by the carrying surface can slide off of it if a sufficient tilt of the carrying surface is achieved so that the static friction between the package and the carrying surface is overcome by gravity.

However, it has been shown that with such a conveyor element no optimal delivery of the package with a view to a gentle handling of the package can be attained. Moreover, the rotation around the swivel axis to be imparted to the axis of rotation at a delivery station so far has not been solved either in regard to cost or to proneness to breakdown.

SUMMARY OF THE INVENTION

An object of this invention is to improve conveyor elements of the initially described type while avoiding their disadvantages, especially to the effect that with small expenditure and a relatively small number of comparatively simple, rugged components, an exceptionally durable tipping conveyor element is provided, which, moreover, guarantees an exceptionally gentle handling of the packages during their delivery, and which further accommodates oblong packages, which usually are placed on the carrying surface of the conveyor element with their longitudinal direction in the conveyor direction, so that they are rotated during their delivery from the carrying surface of the conveyor element toward the delivery direction.

This object according to the invention is achieved by providing that a first shaft (providing a first swivel axis) of the conveyor element, solidly connected to the carrying element, is made to be rotatable in a controlled manner during tipping around a second swivel axis set at an angle to the first swivel axis.

In a conveyor element according to the invention, the point of the carrying surface through which the first swivel axis passes obviously does not remain stationary relative to the support part. In the delivery of the package during the resulting rotation of the carrying surface around the first swivel axis, that point is moved laterally downward and forward. In the resulting tipping rotation movement from the horizontal transport position in the conveying condition to the delivery condition, the carrying surface makes a movement such that it "accompanies" the package on the first section of its delivery path. It has been shown that such a design, which may be attained in suitable configuration with comparatively simple and very rugged components, provides an exceptionally gentle delivery of the package. Tumbling of the packages can be prevented. Even in the case of a different placing on the carrying surface, a package is delivered with relatively slight scattering, and oblong packages, which are placed in the conveying condition in their longitudinal direction on the carrying surface, are rotated during delivery through a considerable angle, so that the receiving devices at a delivery station can be made correspondingly narrower and the forces acting on the package in the subsequent alignment can be correspondingly small.

Preferably, the second swivel axis is coplanar with the first swivel axis when the carrying element is in the conveying condition, that is, when the carrying surface of the conveyor element is substantially horizontal. Such a plane, referred-to above as the initial plane, forms a plane of symmetry of the carrying element and of the conveyor element. Such symmetry is suitable because a conveyor element generally must deliver a package either to one or the other side.

Although the second swivel axis basically may be disposed at a different angle to the horizontal than is the first swivel axis, it has proved especially suitable for the second swivel axis to meet the first swivel axis mirror symmetrically with respect to a horizontal reference plane taken between the carrying element and the support part, in the conveying condition of the carrying element. The two swivel axes, going from their point of intersection, thus run V-shaped in a side view.

To accomplish the best possible delivery of a package it has proved particularly advantageous if the first swivel axis extends downwardly and forward with respect to the conveying direction to form an acute angle with respect to the carrying surface. The first swivel axis does not necessarily have to go through the center of the carrying surface. If can even be advantageous if the first swivel axis so runs in relation to the carrying element that the axis is offset along the longitudinal plane of symmetry of the carrying surface with respect to a cross axis of symmetry of the carrying surface.

The first shaft of the conveyor element is solidly connected to the carrying element in the preferred configuration of this invention and is hinged at its lower end to a second shaft rising up from the support part, running in the direction of or concentric with the second swivel axis. The second shaft preferably is connected solidly to the support part of the conveyor element.

The first shaft connected solidly to the carrying element of the conveyor element is preferably connected to the second shaft of the conveyor element by a universal joint. One axis of rotation of the universal joint preferably runs in the initial plane of the two swivel axes. It has proved particularly suitable for the desired delivery process if the axis of rotation of the universal joint running in the initial plane of the two swivel axes runs at right angls to the second swivel axis.

A tipping element is rotationally mounted on the first and second shafts, preferably between the carrying element and the support part of the conveyor element. The tipping element and the first and second shafts preferably are respectively fixed against relative movement in the longitudinal directions of the shafts. This arrangement provides for two simultaneous movements: rotation of the first shaft around the first swivel axis and the controlled rotation of the first shaft about the second swivel axis.

According to a particularly preferred configuration of this invention, the tipping element is a V-shaped pipe-like body, having a first leg disposed concentrically of the first shaft or the first swivel axis and a second leg disposed concentrically of the second shaft or the second swivel axis, whereby two end surfaces at opposite ends of the tipping element are respectively disposed at right angles to the swivel axes. Preferably, these end surfaces are positioned in opposition to respective surfaces of the carrying element and the support part, spaced therefrom by a small gap. The tipping element can be sealed to the carrying element and support part to protect the bearings and the joint connecting the two shafts from fouling.

In the conveying condition the tipping element is suitably locked, by means of a releasable locking means, against rotation. The locking means is adapted to be unlocked in a controlled manner by an unlocking means placed at each delivery point. After release of the locking means of the tipping element, which release suitably occurs with respect to the support part, the tipping means, upon actuation by an actuation means placed at the delivery station, can then be made to rotate in a controlled manner around the second swivel axis, which obviously results not only in a rotation of the first shaft around the second swivel axis but moreover in a rotation of the first shaft around the first swivel axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
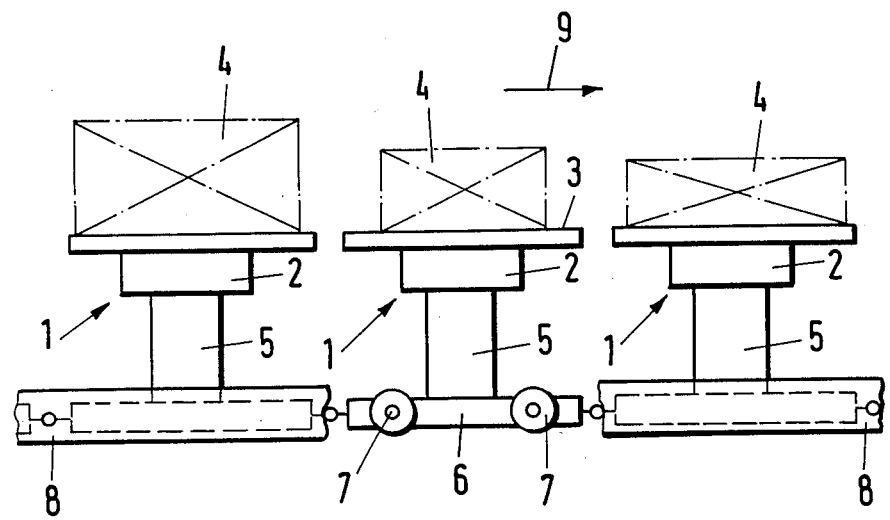
FIG. 1 is a greatly schematized representation of a partial section of a conveyor line of a package conveyor with tipping conveyor elements in side view.
Figure 2:
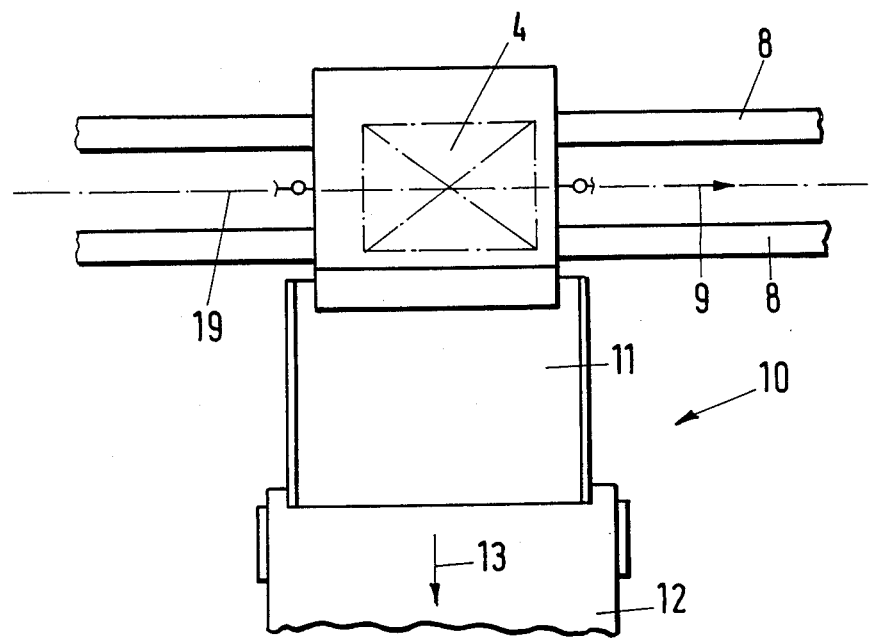
FIG. 2 is a partial top view of the representation according to FIG. 1.

FIGS. 1 and 2 show in a greatly diagrammatic representation a part of a package conveyor provided as a sorter. The sorter includes a plurality of conveyor elements 1, which in each case are flexibly connected to one another and form an endless conveyor line, which rotates in a horizontal plane, but also could run in other directions. Conveyor elements 1 in each case include a carrying element 2, which on its top side is provided with carrying surface 3 for a package 4. Carrying element 2 is supported by a support device, identified as a whole by 5, on a support part 6, which is movable on rollers 7 on a guide 8, which is designed as a double rail (see FIG. 2) and runs in the conveyor direction 9.

Packages 4 in each case are to fed to carrying surface 3 of a conveyor element 1 at several feed points not shown in the drawing. By a tilt of carrying surface 3, which is horizontal in the conveying condition, the packages are to be delivered as desired to one of the delivery stations disposed laterally to conveyor direction 9 and provided along the conveyor track.

Such a delivery station 10 is diagrammatically represented in FIG. 2. It comprises, besides devices by which a delivery of a package 4 conveyed by a specific conveyor element 1 is to be triggered, a chute 11 running obliquely to the horizontal, which is so arranged that package 4, to be delivered by sliding down from carrying surface 3 of the respective conveyor element 1, gets to chute 11 and from there is fed to a conveyor 12 of delivery station 10, which conveyor 12 delivers the respective package 4 according to arrow 13 crosswise to the conveyor direction according to arrow 9.

Figure 3:
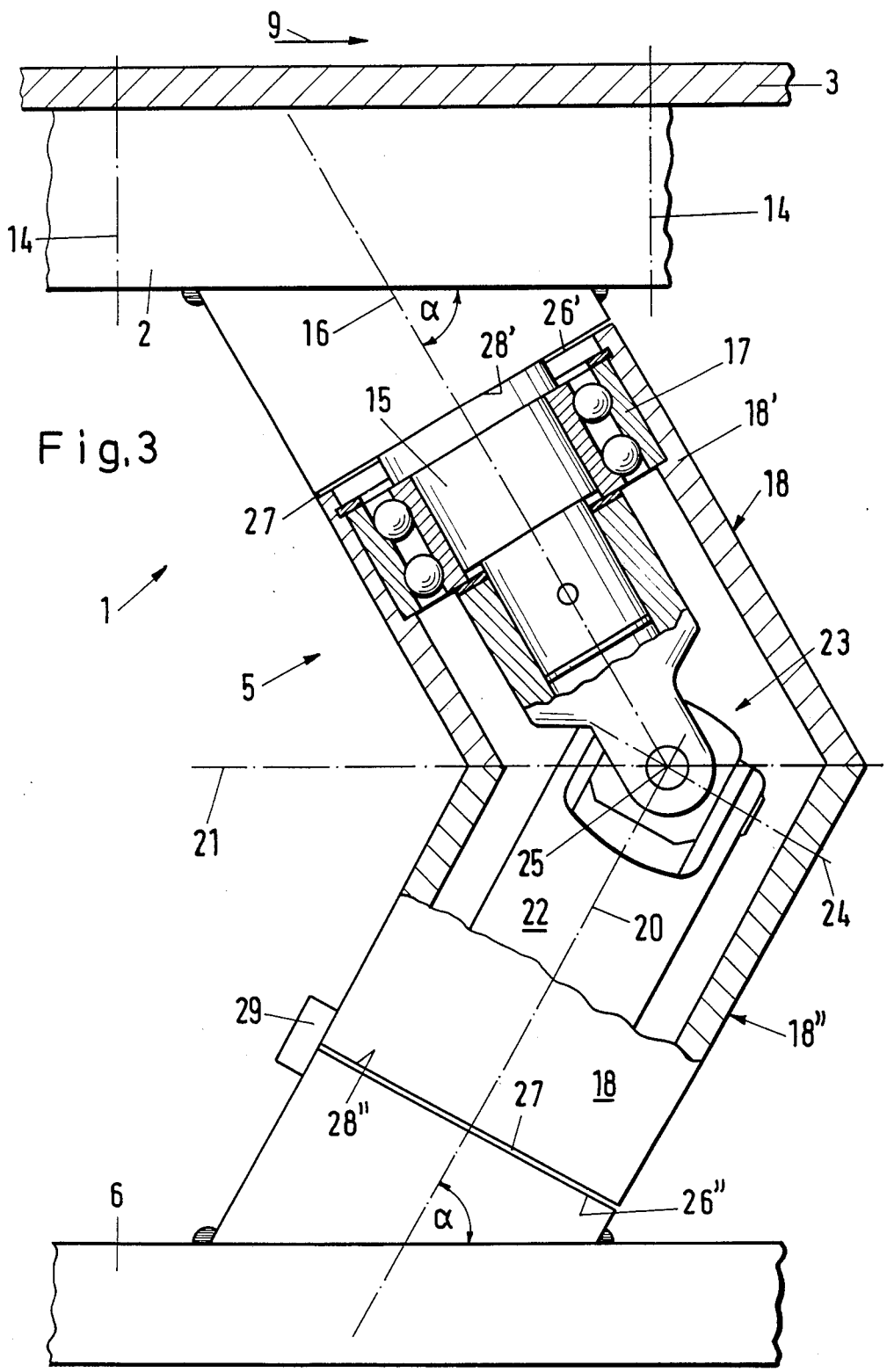
FIG. 3 is a simplified partial representation of a tipping conveyor element according to the invention in side view, partially in section.

FIG. 3 shows, in a somewhat schematized side partial view, considerably enlarged in comparison with FIGS. 1 and 2, a conveyor element 1, whose carrying element 2 is connected by connecting means 14, of which only the center lines are shown, to carrying surface 3 for support of a package 4. From the underside of carrying element 2 a first shaft 15 of conveyor element 1 extends obliquely downward. Shaft 15 is concentric to a first swivel axis 16. Carrying element 2 is solidly connected to carrying surface 3, in a way that will be described in more detail below. It is mounted to be rotatable around first swivel axis 16 be means of first shaft 15 and to mvoe relative to support part 6. Such rotation is aided by means of a bearing 17, which in the present case is a roller bearing, whose inner race is solidly fastened to first shaft 15 and whose outer race is connected to a tipping element 18 essentially forming support device 5. The tipping element will be described in greater detail below. First swivel axis 16 lies in a common vertical plane with a plane of symmetry 19 (see FIG. 2) of carrying element 2 or its carrying surface 3. First swivel axis 16 lies in conveyor direction 9, and forms an acute angle α with the section of carrying surface 3 lying ahead in conveyor direction 9.

First shaft 15 of conveyor element 1 is solidly connected to carrying element 2 and, when carrying element 2 is tipped, is rotatable in a controlled manner around a second swivel axis 20 that is disposed at an angle to first swivel axis 16, as is seen from the further description below in greater detail. In the conveying condition of carrying element 2, in other words in the case of a horizontal disposition of carrying surface 3, the second swivel axis 20 lies in the same plane (initial plane) as first swivel axis 16 and the plane of symmetry 19 of carrying element 2. Moreover, in the conveying condition of carrying element 2, and relative to a horizontal reference plane 21 running between carrying element 2 and support part 6, the second swivel axis 20 is disposed mirror symmetrically to first swivel axis 16, whereby consequently a second angle α to the horizontal is of equal size to the first-mentioned angle α, and in the example represented is 60°.

First shaft 15 of conveyor element 1 is hinged on its lower end to a second shaft 22 of the conveyor element. Shaft 22 rises up obliquely to support part 6 and is disposed concentrically to second swivel axis 20. Shaft 22 is solidly connected to support part 6 of conveyor element 1. Between tipping element 18 and second shaft 22 a bearing is placed in a way analogous to bearing 17 of first shaft 15, which second bearing for the sake of simplicity is not shown in detail in the drawing.

First shaft 15 is connected to second shaft 22 of conveyor element 1 by a universal joint 23. One axis of rotation 24 of universal joint 23 lies in the initial plane, in which the two swivel axis 16, 20 are found in the conveying condition and in which the plane of symmetry 19 of carrying surface 3 lies in the conveying condition. Axis of rotation 24 of universal joint 23 is disposed at right angles to second swivel axis 20 in the initial plane, while the other axis of rotation 25 of universal joint 23, of course, also runs at right angles to axis of rotation 24.

As was already indicated above, tipping element 18, placed between carrying element 2 and support part 6 of conveyor element 1, in each case is rotatably mounted on first shaft 15 and on second shaft 22 by means of a bearing (e.g. 17), but in each case is not movable in the longitudinal directions of the two shafts 15 or 22 or of the two swivel axes 16 or 20.

Tipping element 18 is designed as a V-shaped pipe body, whose upper (first) leg 18', turned toward carrying element 2, runs concentrically to first shaft 15 or first swivel axis 16, and whose second leg 18" runs concentrically to second shaft 22 or second swivel axis 20. The two end faces 26' or 26" of tipping element 18 in each case are disposed at right angles to the respective swivel axis 16 or 20 and, in each case, are opposed to a parallel surface 28' of carrying element 2 and parallel surface 28" of support part 6, separated therefrom by small spaces 27. In each case, the small spaces 27 are sealed by a seal, not shown in the drawing.

Figure 4:
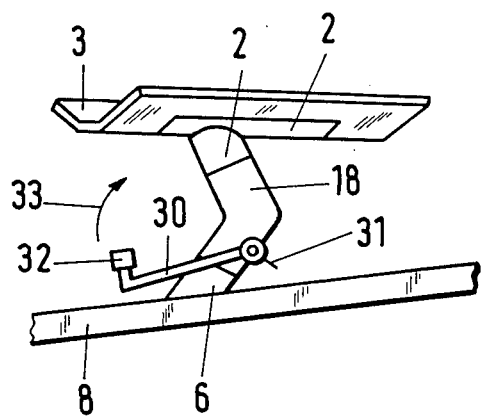
FIG. 4 is a simplified partial representation of a conveyor element in the conveying condition.

Tipping element 18, in the conveying condition shown in FIG. 3 and 4, is locked from rotating on support part 6 by means of a locking means 29 only diagrammatically represented in FIG. 3, whereby tipping element 18, in locked condition, cannot rotate around second swivel axis 20. Consequently, carrying element 2 is locked with respect to the two shafts 15, 22 and universal joint 23 connecting them. Locking means 29 of conveyor element 1 is to be unlocked in a controlled manner by unlocking means placed at each delivery station 10. Such an unlocking can result from the fact that a lever 30 on a horizontal swivel axis 31 is hinged on tipping element 18 as shown in FIG. 4. Lever 30 has a laterally projecting free end on which, for example, a roller 32 can be attached. At a delivery station 10 at which the conveyor element is to deliver package 4 transported by it, roller 32 strikes a ramp and swings up around swivel axis 31 in the direction of arrow 33, as a result of which lever 30 acts on locking means 29 and it is unlocked. Since conveyor element 1 is to be able to be emptied on both sides, a corresponding lever 30 is placed on each side of tipping element 18, or a component is provided which on both sides of the conveyor track is to be actuated at delivery station 10 for unlocking locking means 29.

After lever 30, which is not shown in FIG. 3 for the sake of a better view, has been swung up and locking means 29 consequently has been unlocked, tipping element 18 is rotated in a controlled manner around second swivel axis 20 by an actuation means placed at the respective delivery station 10. This can result, for example, from the fact that roller 32 of lever 30 goes onto a guide rail placed at delivery station 10, a rail that is curved or bent so that, upon the passing of roller 32, a rotation of tipping element 18 around second swivel axis 20 of conveyor element 1 occurs.

Figure 5:
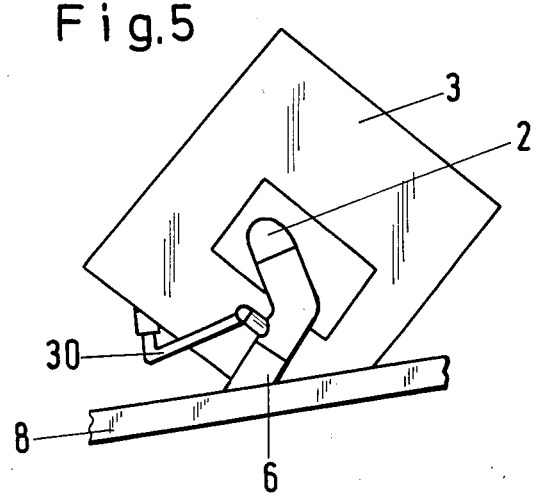
FIG. 5 is a representation corresponding to FIG. 4, in which the carrying element of the conveyor element is in the delivery position.

With the rotation of tipping element 18 around second swivel axis 20, the position of the support part 6 carried by guide 8 obviously does not change relative to guide 8—apart from the forward movement of the conveyor direction. On the other hand, a rotation of tipping element 18 around second swivel axis 20 produces a rotational tipping movement of carrying element 2 and thus of its carrying surface 3 up to a delivery position represented in FIG. 5; however, the delivery position according to FIG. 5 corresponds to an actuation of a lever 30 that is not shown in FIG. 4 but is found on the other side of tipping element 18 at a delivery station 10. An actuation of the lever 30 that is shown in FIGS. 4 and 5 would cause a rotational tipping to the other side. With this rotational tipping movement of carrying element 2 or its carrying surface 3 from its horizontal conveying condition according to FIGS. 3 and 4, a rotation of carrying surface 3 takes place both around second swivel axis 20 and around first swivel axis 16. First swivel axis 16 is rotated around second swivel axis 20, so that generally a geometrically rather complicated movement of carrying surface 3 of carrying element 2 of conveyor element 1 supporting a package 4 results, a movement in which carrying surface 3 is brought to a tilt in the direction of the delivery side but in doing so at the same time is lowered in the center and during the rotation is moved forward, so that the carrying surface by imparting a corresponding acceleration at first accompanies package 4 during delivery, and package 4 in an extremely gentle way is transferred to downstream chute 11 (see FIG. 2).

By this accompanying movement of the carrying surface during delivery and the movements or forces thus applied to the package at the same time, a certain deflection of the longitudinal axis of package 4 running conveyor direction 9 on conveyor element 1 occurs, which is highly advantageous especially for oblong packages, since as a result they are already turned in regard to their spatial orientation and consequently are routed into the receiving devices of delivery station 10 in a considerably more favorable way then is the case in the conveyor elements known so far.

Despite the considerable advantages of the conveyor element according to the invention it obviously can be achieved with comparatively few, simple and rugged components, so that a conveyor element according to the invention has been provided, which in an exceptional way takes into account not only conveyor engineering requirements—including very gentle handling of the packages—but also because of its simple and rugged practicability is favorable in cost and exceptionally reliable in operation.

I claim:

1. In a driven conveyor having a plurality of conveyor elements connected to one another and movable along guide means in a conveying direction, a conveyor element, a portion of which is selectively tippable, upon actuation by actuator means, from a conveying condition for supporting and conveying an article into a delivery condition for the delivery of the article from the conveyor element, said conveyor element comprising:
   a support part having means for movably supporting said support part on guide means for movement in a conveying direction;
   a tippable carrying element movable between said conveying condition and said delivery condition, said carrying element having a carrying surface for supporting an item, said carrying surface being substantially horizontal when in said conveying condition, said carrying element being substantially symmetric with respect to a plane of symmetry thereof;
   a shaft depending from said carrying element, extending toward said support part, and laying in said plane of symmetry of said carrying element, a longitudinal axis of said shaft providing a first swivel axis disposed at an acute angle with respect to said carrying surface;
   a stud projecting upwardly from said support part, a longitudinal axis of said stud providing a second swivel axis, a distal end of said shaft being pivotally connected to said stud;
   a support device disposed between said support part and said carrying element, said support device supporting said carrying element and rotatingly mounting at least said shaft;
   means for selectively preventing rotation of said support device about said second swivel axis; and
   means responsive to the actuator means for rotating said shaft in a controlled manner about said second swivel axis to move said carrying element between said conveying condition and said delivery condition.

2. A conveyor element according to claim 1, wherein said second swivel axis lies in said plane of symmetry and is substantially coplanar with said first swivel axis when said conveying element is in said conveying condition.

3. A conveyor element according to claim 1 or claim 2, wherein, when said carrying element is in said conveying condition, said first and second swivel axes make substantially identical and symmetric angles with respect to a reference plane taken between said carrying element and said support part, normal to said plane of symmetry and substantially parallel to said conveying direction.

4. A conveyor element according to claim 1, wherein said first swivel axis extends toward said support part and forwardly in said conveying direction.

5. A conveyor element according to claim 1, wherein said stud is fixed on said support part.

6. A conveyor element according to one of claims 1 or 5, wherein said shaft is connected to said stud by a universal joint.

7. A conveyor element according to claim 6, wherein an axis of rotation of said universal joint is coplanar with said first and second swivel axes when said carrying element is in said conveying condition.

8. A conveyor element according to claim 7, wherein said coplanar axis of rotation of said universal joint is disposed normal to said second swivel axis.

9. A conveyor element according to claim 1, wherein said shaft is a first shaft, said stud is a second shaft and said support device comprises a tipping element mounted for relative coaxial rotation with respect to said first and second shafts.

10. A conveyor element according to claim 9, wherein said tipping element is fixed against relative movement with respect to said first and second shafts in the longitudinal directions thereof.

11. A conveyor element according to claim 9 or claim 28, wherein said tipping element is a V-shaped pipe-like body having a first leg disposed concentrically of said first shaft and a second leg disposed concentrically of said second shaft.

12. A conveyor element according to claim 11, said tipping element having first and second end surfaces lying in planes that are disposed substantially normal to said first and second swivel axes, respectively, said carrying element and said support part comprising surfaces that are respectively opposed to said first and second end surfaces of said tipping element, are respectively substantially parallel thereto and are respectively spaced therefrom with small gaps therebetween.

13. A conveyor element according to claim 12, wherein said tipping element is sealed to said carrying element and to said support part.

14. A conveyor element according to claim 9 or claim 10, said means for selectively preventing rotation of said support device comprising releasable locking means for locking said tipping element to said support part for the prevention of rotation of said tipping element with respect to said support part, said locking means being adapted to be unlocked upon actuation thereof by unlocking means disposed at a delivery station.

15. A conveyor element according to claim 14, wherein said tipping element is adapted to be actuated by the actuator means disposed at a delivery station and to be rotated about said longitudinal axis of said second shaft in a controlled manner in response to said actuation.

16. A conveyor element according to claim 15, further comprising at least one lever for unlocking said locking means, said at least one lever being adapted to be pivoted by unlocking means disposed at a delivery station, said at least one lever further comprising means for rotating said tipping element about said longitudinal axis of said shaft upon contact of said at least one lever with said actuation means.

17. A conveyor element according to clam 1, wherein said carrying surface is substantially symmetric about a cross-plane taken normal to said plane of symmetry and to said conveying direction, said first swivel axis intersecting said carrying surface at a point of said carrying surface that is offset from said cross-plane of symmetry.

* * * * *